United States Patent
Liu (10) Patent No.: US 7,418,245 B2
(45) Date of Patent: Aug. 26, 2008

(54) WIRELESS DEVICE AND METHOD FOR RADIO CONTROL

(75) Inventor: I-Ru Liu, Taipei (TW)

(73) Assignee: Accton Technology Corporation, Hsinchu (TW)

(*) Notice: Subject to any disclaimer, the term of this patent is extended or adjusted under 35 U.S.C. 154(b) by 542 days.

(21) Appl. No.: 11/247,346

(22) Filed: Oct. 11, 2005

(65) Prior Publication Data
US 2007/0082632 A1  Apr. 12, 2007

(51) Int. Cl.
*H04B 1/18* (2006.01)
(52) U.S. Cl. .............. 455/161.1; 370/241; 370/328; 370/338
(58) Field of Classification Search .............. 455/161.1; 370/241, 338, 328
See application file for complete search history.

(56) References Cited
U.S. PATENT DOCUMENTS

2004/0028003 A1* 2/2004 Diener et al. ............... 370/319
2005/0276276 A1* 12/2005 Davis ......................... 370/447
2006/0099954 A1* 5/2006 Henderson et al. .......... 455/447
2006/0135083 A1* 6/2006 Leinonen et al. ............. 455/78
2006/0270433 A1* 11/2006 Kelton et al. ................ 455/522

* cited by examiner

*Primary Examiner*—Dwayne Bost
*Assistant Examiner*—Inder P Mehra
(74) *Attorney, Agent, or Firm*—Thomas, Kayden, Horstemeyer & Risley (57) ABSTRACT

A method of radio control, adapted in a wireless device that includes a cognitive radio and a free radio. First, the cognitive radio scans within vicinity or range to receive frames sent from or to the free radio, for retrieving therefrom network information of on-air frames indicative of past operational status of the free radio. Next, network operation commands of the free radio are sensed by the cognitive radio, in which the network operations commands being indicative of present operational status of the free radio. Then, a step is performed using the cognitive radio to read network flags generated in the free radio indicative of future operational status of the free radio. Following operation of the cognitive radio is then configured based on at least one of the past, present and future operational status of the free radio so as to reduce channel interferences with the free radio.

19 Claims, 5 Drawing Sheets

| Free Radio Past Operation Status | Information of on-air frames sent from free radio | Information of on-air frames sent to free radio |
|---|---|---|
| Free Radio Future-in-the-past Operation Predicted | Rx | Tx |
| Cognitive Radio Following Operation Suggested | Rx or Tx | Tx or Rx |
| | Standby or Rx | Standby or Tx |
| | Standby | Standby |

| | Positive T/R Command | Negative T/R Command |
|---|---|---|
| Free Radio Present Operation Status | Tx | Rx |
| Cognitive Radio Following Operation Suggested | Standby/Tx | Standby/Rx |

FIG. 4C

| | Flag preparing to transmit | Flag preparing to receive |
|---|---|---|
| Free Radio Future Operation Status | Tx | Rx |
| Cognitive Radio Following Operation Suggested | Standby/Tx | Standby/Rx |

WIRELESS DEVICE AND METHOD FOR RADIO CONTROL

BACKGROUND OF THE INVENTION

1. Field of the Invention

The invention relates in general to a communications device, and more particularly to a wireless communications device and a method of radio control adapted therefor.

2. Description of the Related Art

In a network device, two radios are increasingly preferred over one radio in order to improve quality of link and service, and to expand functionality in networking. For instance, user can have two radios be used as access points to enhance throughput and latency; or have one radio be used as an access point and have another be dedicated to operate as monitor for site surveying or operate as bridge or wireless distribution service for backhauling. However, the inherent problem with a co-located two-radio system is the interference of one radio to another.

There are several causes for interferences of in-band or out-band frequencies. One can be attributed to sidelobe interferences. That is, the sidelobes of one channel, fall in the in-band adjacent or alternative channels and interfere with another carriers operating therein. Another cause of interference is due to third order intermodulation, in which the fundamental frequency of a signal and the second harmonic of aother signal result in frequency mixing. A third cause of interference arises from the interference of the second harmonic of a signal in a band with other signals out of the band. Hence, channel isolation is required to prevent interferences.

Non-adaptive antenna and radio screening method has been proposed to provide isolation between channels. Interferences are mitigated using extremely non-overlapped channels, such as ch. 1 and ch. 11 for a IEEE 802.11g standard, with very broad guard-channel therebetween. Interferences are also lowered using wide separated antennae, with very broad guard-spacing therebetween.

The non-adaptive method in common guard and attenuation solely provides the purpose of screening, and is yet to provide a satisfactory result towards reducing interferences. However, the conventional method poses limitation towards the allowed spacing between two operating channels and between two antennae, thereby reducing flexibility.

SUMMARY OF THE INVENTION

It is therefore an object of the invention to provide isolation between two radios operating in dual channels.

It is therefore another object of the invention to reduce interferences from one radio to another.

The invention achieves the above-identified object by providing a method of radio control, adapted in a wireless device that includes a cognitive radio and a free radio. The method begins by utilizing the cognitive radio to scan the wireless area within vicinity or range to receive on-air frames transmitted from or to free radio, for retrieving therefrom network information of on-air frames indicative of past operational status of the free radio. A step is also performed to sense by the cognitive radio network operation commands of the free radio, in which the network operation commands being indicative of present operational status of the free radio. Then, another step is performed using the cognitive radio to read network flags generated in the free radio indicative of future operational status of the free radio. Thereafter, a step is executed to configure future operation of the cognitive radio based on at least one of the past operational status, the present operational status, and the future operational status of the free radio so as to reduce channel interferences with the free radio.

The invention achieves the above-identified object also by providing a wireless device connecting to a network. The device includes a cognitive radio and a free radio. The free radio includes a controller, a radio circuit, and an antenna assembly. The controller processes data to/from the network. The radio circuit is in electrical communication with the controller to modulate data from the controller and to demodulate data to the controller. The antenna assembly is in electrical communication with the radio circuit to transmit signals received from the radio circuit, and to receive signals, which are sent to the radio circuit. The cognitive radio scans the wireless area and searches therein for network information of on-air frames sent from or to the free radio. The free radio is in communication with the similarly structured cognitive radio, and the cognitive radio senses network operation commands of the free radio and reads network flags generated in the free radio. Future operation of the cognitive radio is then configured based on at least one of the network information of on-air frames, the network operation commands, and the network flags of the free radio.

Other objects, features, and advantages of the invention will become apparent from the following detailed description of the preferred but non-limiting embodiments. The following description is made with reference to the accompanying drawings.

DETAILED DESCRIPTION OF THE INVENTION

The disclosed embodiments provide an approach of cognitive radio techniques to detect network conditions and adapt to them, thereby reducing interference with other co-located radios.

Figure 1:
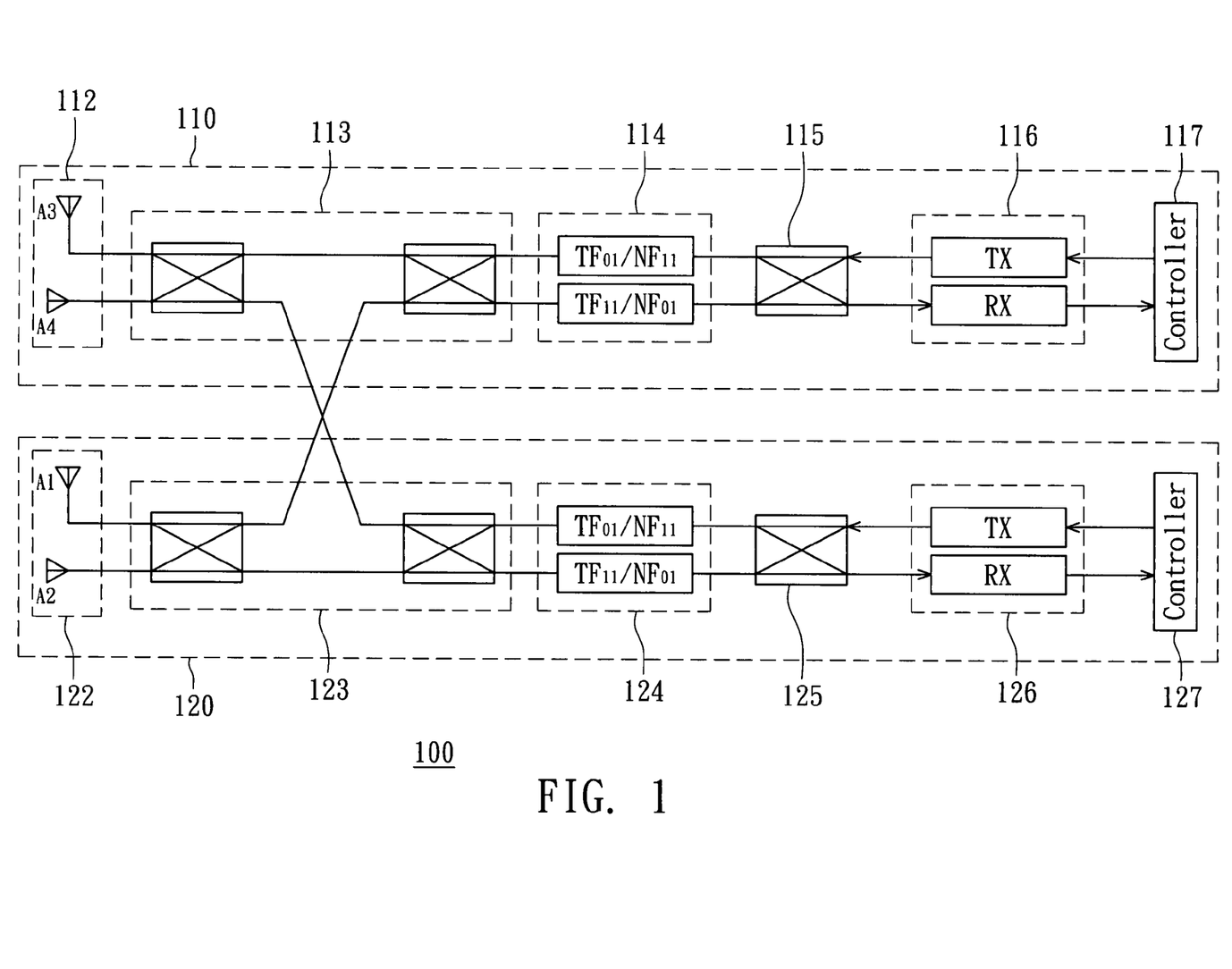
FIG. 1 shows a block diagram of a wireless device according to an embodiment of the invention.

FIG. 1 shows a block diagram of a wireless device according to an embodiment of the invention. The wireless device 100 includes a cognitive radio 110 and a free radio 120. The free radio 120 includes an antenna assembly 122, a first switch network 123, a filter element 124, a second switch network 125, a radio circuit 126, and a controller 127. The wireless device 100 is connected to a network (not shown). The antenna assembly 122 is for receiving signals from the wireless area that are to be sent to the radio circuit 126, or transmitting signals received from the radio circuit 126 to the wireless area. The controller 127 processes data to and from the network. In some embodiments, the controller 127 includes a baseband processor (BBP) and a media access control (MAC) (not shown). The radio circuit 126 includes a transmitter circuit TX and a receiver circuit RX, which are in electrical communication with the controller 127 to modulate data from the controller 127 and to demodulate data to the controller 127, respectively. The first switch network 123 provides electrical communication between the free radio 120 and the similarly structured cognitive radio 110 in transferring signals therebetween, and provides electrical communication between the antenna assembly 122 and the radio circuit 126. Advantageously, the first switch network 123 includes double-pole-double-throw switches. The filter element 124 is coupled to the antenna assembly 122 via the first switch network 123, for blocking or attenuating interferences associated with the signals received from the antenna assembly 122 which are sent to the radio circuit 126, or blocking or attenuating interferences associated with the signals received from the radio circuit 126 which are sent to the antenna assembly 122. Advantageously, the filter element 124 includes band pass filter and band reject filter as channel filter for passing the signals of own radio channel and rejecting the signals of other radio channel. In this embodiment, the antenna assembly 122 includes two antenna elements A1 and A2. Advantageously, the antenna elements A1 and A2 are orthogonally polarized for passing the signal of co-polarization characteristic, and to reject or attenuate the signal of cross-polarization characteristic. The second switch network 125 switches operation of the radio circuit 126 between modulation and demodulation. Advantageously, the second switch network includes double-pole-double-throw switches.

The cognitive radio 110, as mentioned, is similarly structured to the free radio 120, and includes an antenna assembly 112, a first switch network 113, a filter element 114, a second switch network 115, a radio circuit 116, and a controller 117, and perform substantially the same function as the corresponding components of the free radio 120. The antenna assembly 112 is shown having two antenna elements A3 and A4. The distance between antenna assembly 112 and antenna assembly 122 has sufficient spacing for receive diversity or transmit diversity; additionally for transmit-receive isolation in this art. Advantageously, the antenna assembly 112 and antenna assembly 122 include respective elements by the designs of antenna array or others, which form radiation patterns with nulls toward each other and with peaks at least not aiming to each other.

The first switch networks 113 and 123 of FIG. 1 are shown interconnected to each other, and collectively form a switch network that functions to assign a pair of the antenna elements A1~A4 to each of the free radio 120 and the cognitive radio 110 according to a strategy giving the tradeoff for best performance. The tradeoff, that includes antenna gain, antenna array gain, azimuth coverage, elevation coverage, range, space diversity, polarization diversity, pattern diversity, isolation due to spacing, isolation due to polarization difference, isolation due to pattern difference and so forth, depends on the application of wireless device in which the antenna elements are built.

Figure 2:
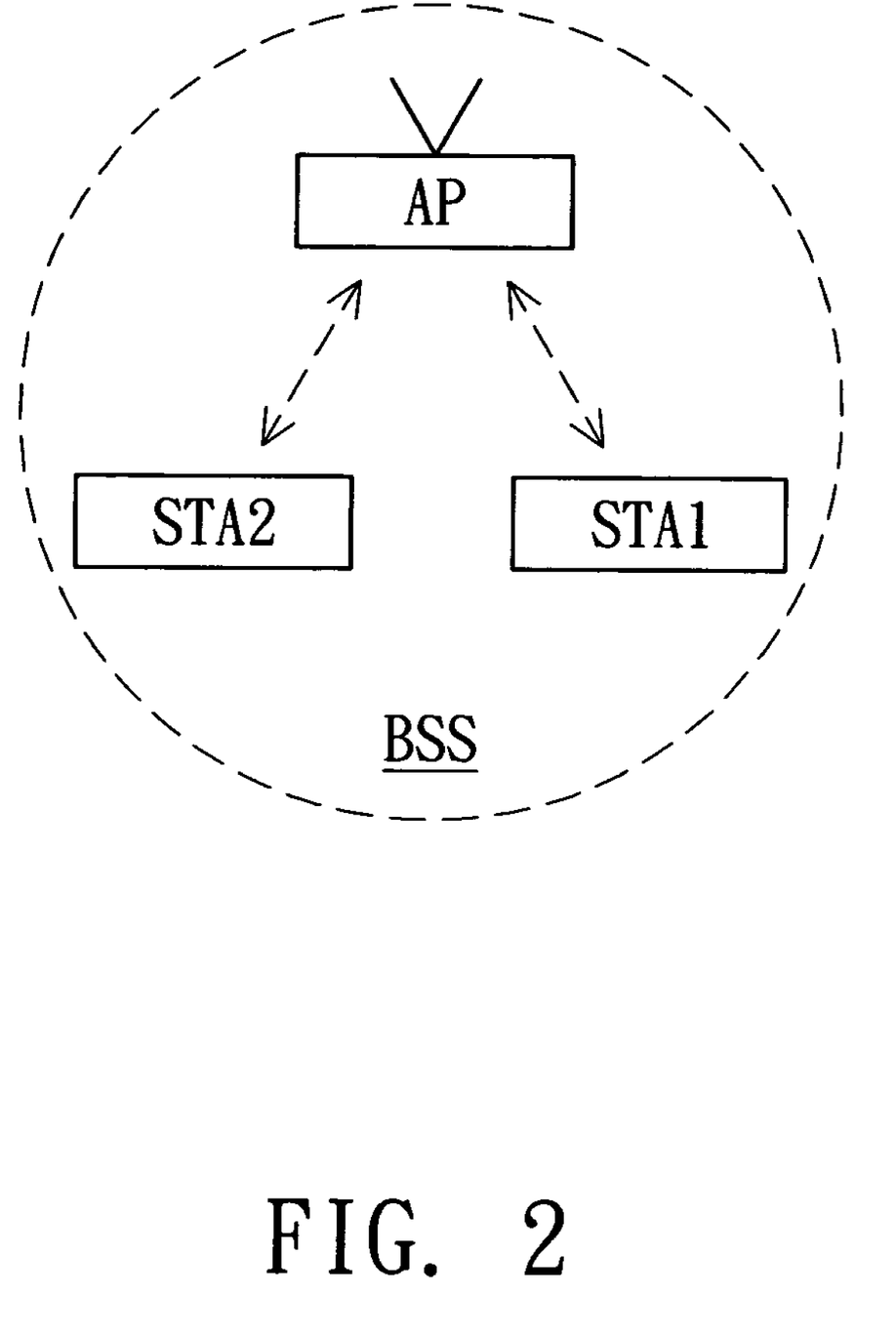
FIG. 2 shows illustration of a basic service set (BSS) in an IEEE 802.11 based wireless network according to an embodiment of the invention.

FIG. 2 shows illustration of a basic service set (BSS) in an IEEE 802.11 based wireless network according to an embodiment of the invention. The stations (STA1 and STA2) in the BSS are serviced by an access point (AP). In some embodiments of the invention, the wireless device 100 can either be an AP or STA in the BSS.

Structurally, the free radio 120 is in communication with the cognitive radio 110 via hardware wiring, as shown by the cables interconnecting the first switch networks 113 and 123. Alternatively, the cognitive radio 110 and the free radio 120 can communicate via software transfer by implementing the controllers 117 and 127 of the two radios in one chip.

In operation, the wireless device 100, either as the AP or one of the STAs in the BSS, is controlled by a complex time-division multiplexing system, and is assigned distinct BSSID's to the free radio 120 and the cognitive radio 110. The free radio 120 is first selected to operate freely under any channel. For instance, for an IEEE 802.11g standard, the free radio 120 first operates in channel 1 for normal operation to either transmit or receive signals. The cognitive radio 110 is then selected to operate under the same channel, Ch. 1, and to perform cognitive actions described as follows.

The cognitive radio 110 performs a first cognitive action by scanning wireless area within vicinity or range and searches therein for network information of on-air frames sent from or to the free radio 120. The network information of on-air frames gives clue as to what types of frames are being sent from the free radio 120 of own AP (or STA) and/or the radios of other STA's (or AP's) by the identification of the frame's format distinguishable and the BSSID contained in the frame, by which past operational status of the free radio 120 and/or other radios can be measured, and predictions of the following operation of the free radio 120 can be made according to a preferred rule as later discussed.

The cognitive radio 110 performs a second cognitive action by sensing network operation commands of the free radio 120. The network operational commands include transmit and receive commands (T/R commands). From the T/R commands, the cognitive radio 110 is able to determine whether the transceiver circuit TX or the receiver circuit RX of the free radio 120 is currently active. The cognitive radio 110 is then able to determine the following operation of the free radio 120 by another preferred rule as later discussed.

The cognitive radio 120 performs a third cognitive action by reading the network flags generated in the free radio 110, which directly gives information of on-air frames to the future operational status of the free radio 110. The network flags are typically generated in the MAC layer within controller 127 of the free radio 120. Without further predictions, the following operation of the free radio 120 is readily known.

Hence, based on at least one of the network information of on-air frames, the network operation commands, and the network flags of the free radio 120, the cognitive radio 110 is then configured to operate in a channel that avoids interferences, or non-overlapped, by the free radio 110. For instance, in the last example with the IEEE 802.11g standard, the free radio 120 can operate in channel one, Ch. 1, while the cognitive radio 110 operates in channel eleven, Ch. 11.

Figure 4A:
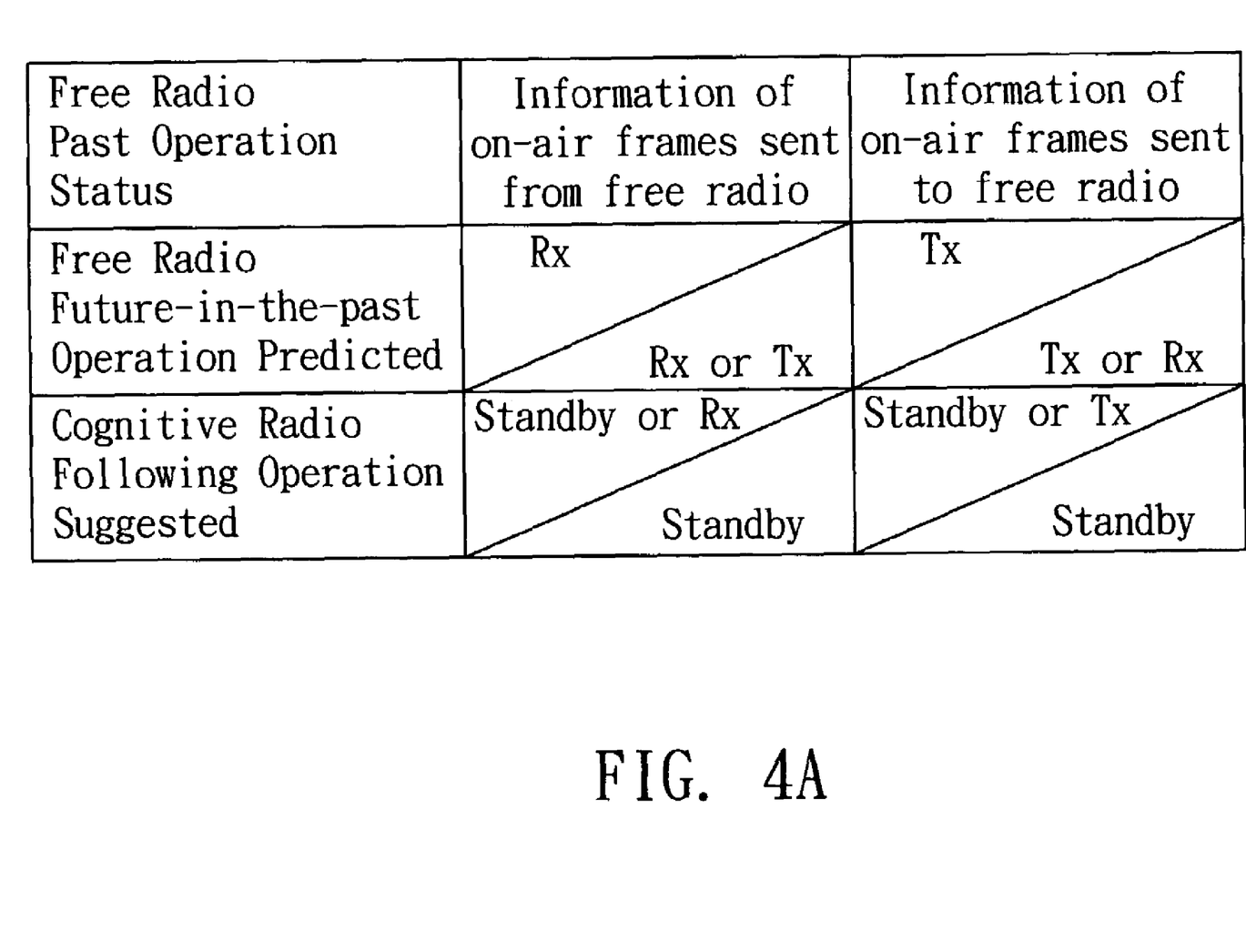
FIG. 4A shows a table of the cognitive radio being configured based on the network information of on-air frames sent from or to the free radio according to a preferred rule in an embodiment of the invention.

As mentioned earlier, the cognitive radio 110 is configured based on the network information of on-air frames according to the preferred rule, which is shown in FIG. 4A. That is, if the network information of on-air frames sent from the free radio 120 (indicative of free radio past operational status) is transmission, then it can be predicted that the present (or the future in the past, strictly speaking) operation of the free radio is reception. Examples of network information of on-air frames retrieved from data frames that would lead to such predictions about the free radio of own AP include association responses, re-association responses, probe responses, clear to send or others. A transmitting signal is likely to interfere with a receiving signal; thus, to avoid such problems, the following operation of the cognitive radio is configured not to transmit, but rather to either standby or receive (indicated by "1" on the figure). If however, there is uncertainty in the following operation of the free radio in which it can either be configured to transmit or receive (RX or TX), then the cognitive radio enters a standby status ("2" on the figure). Network information of on-air frames that for instance deals with beacons, acknowledgments, data or others, which retrieved from the frames leads to such uncertainty.

Conversely, if the network information of on-air frames, include association requests, re-association requests, probe requests, request to send or others, sent from the free radio 120 of other STA shows the free radio 120 of own AP is reception, then it can also be predicted that the free radio 120 would likely be set to transmit in present or future in the past. Hence, the following operation of the cognitive radio is configured also to transmit or standby, thereby reducing chances for interferences ("3" on the figure). Likewise, if there is uncertainty led by the reception of acknowledgments or data for example in the following operation predictions of the free radio, then the cognitive radio enters a standby status ("4" on the figure).

Figure 4B:
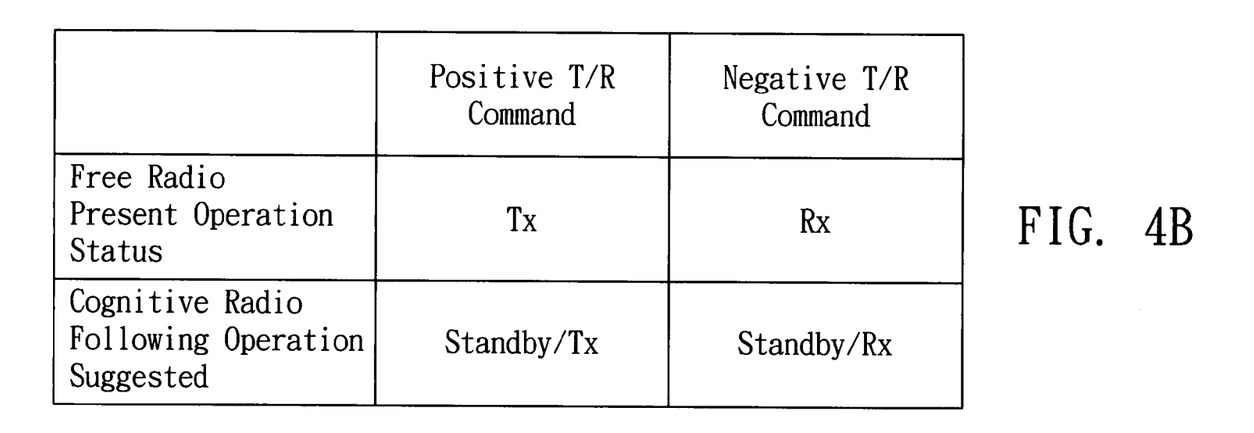
FIG. 4B shows a table of the cognitive radio being configured based on the network operation command of the free radio according to another preferred rule in an embodiment of the invention.

FIG. 4B shows how the cognitive radio 110 is configured based on the network operation command according to the other preferred rule. As shown, if the network operation command (T/R command) is positive, meaning that the present operational status of the free radio is to transmit TX, then in response the cognitive radio enters into a standby or transmit status. If however, the free radio is to receive RX, marked by a negative T/R command, then the cognitive radio is to receive or standby.

Figure 4C:
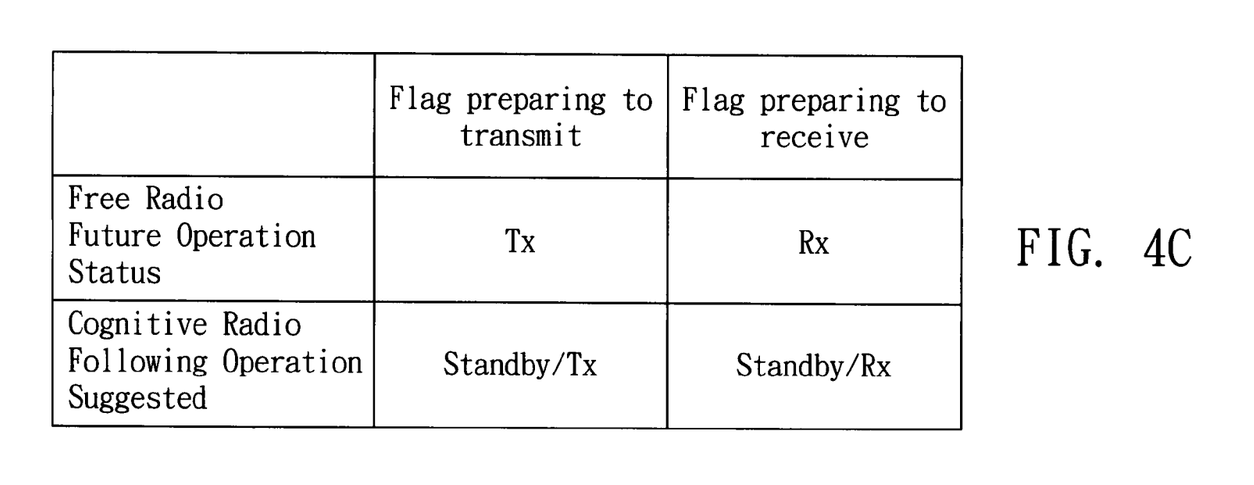
FIG. 4C shows a table of the cognitive radio being configured based on the network flags of the free radio according to yet another preferred rule in an embodiment of the invention.

The cognitive radio 110 is configured based on the network flags according to yet the other preferred rule as shown in FIG. 4C. If the network flags indicate that the future operational status of the free radio 120 is to transmit, then the future following operations of the cognitive radio 110 are configured to either standby or transmit. If the network flags indicate that the future operational status of the free radio 120 is to receive, then the future following operations of the cognitive radio 110 are configured to receive or standby.

To provide much attenuation of isolation between non-overlapped channels of different radios, at least some embodiments of the invention can further include peak/null orthogonal schemes. Thence, the filter element 114 and 124 can both include tuned filters and notch filters advantageously. For instance, in case when the free radio 120 operates under Ch. 1 and the cognitive radio 110 operates under Ch. 11 of a 802.11g band, the tuned filter of the free radio 120 is used to pass the signals of own channel (Ch. 1) by the peak of the tuned filter, while the notch filter is used to reject or attenuate signal of other channel (Ch. 11) by the null of the filter. Likewise, the tuned filter of the cognitive radio 110 is used to pass the signals of Ch. 11, and reject signals of Ch. 1. In case both radios operate under same channel, then the tuned filters are to be set at that channel and the notch filters are set to an unused non-overlapped channel, or two filters are set to bypass.

Thus, by following the preferred rules, the cognitive radio can be effectively configured based on at least one of the past, present and future operational status of the free radio to thereby reduce interferences.

In application, the free radio and the cognitive radio can operate in as AP using same channel of non-concurrent radios, or as AP using different channels of concurrent radios. Alternatively, one can be used as an AP, and the other can be used in site-surveying for that AP. In another application, one radio is used for AP, and another radio is used for wireless distribution service link to that AP. In other applications, both radios are used to serve as a PtP (Point-to-Point) bridge and/or a PtMP (Point-to-Multi-Point) bridge.

Figure 3:
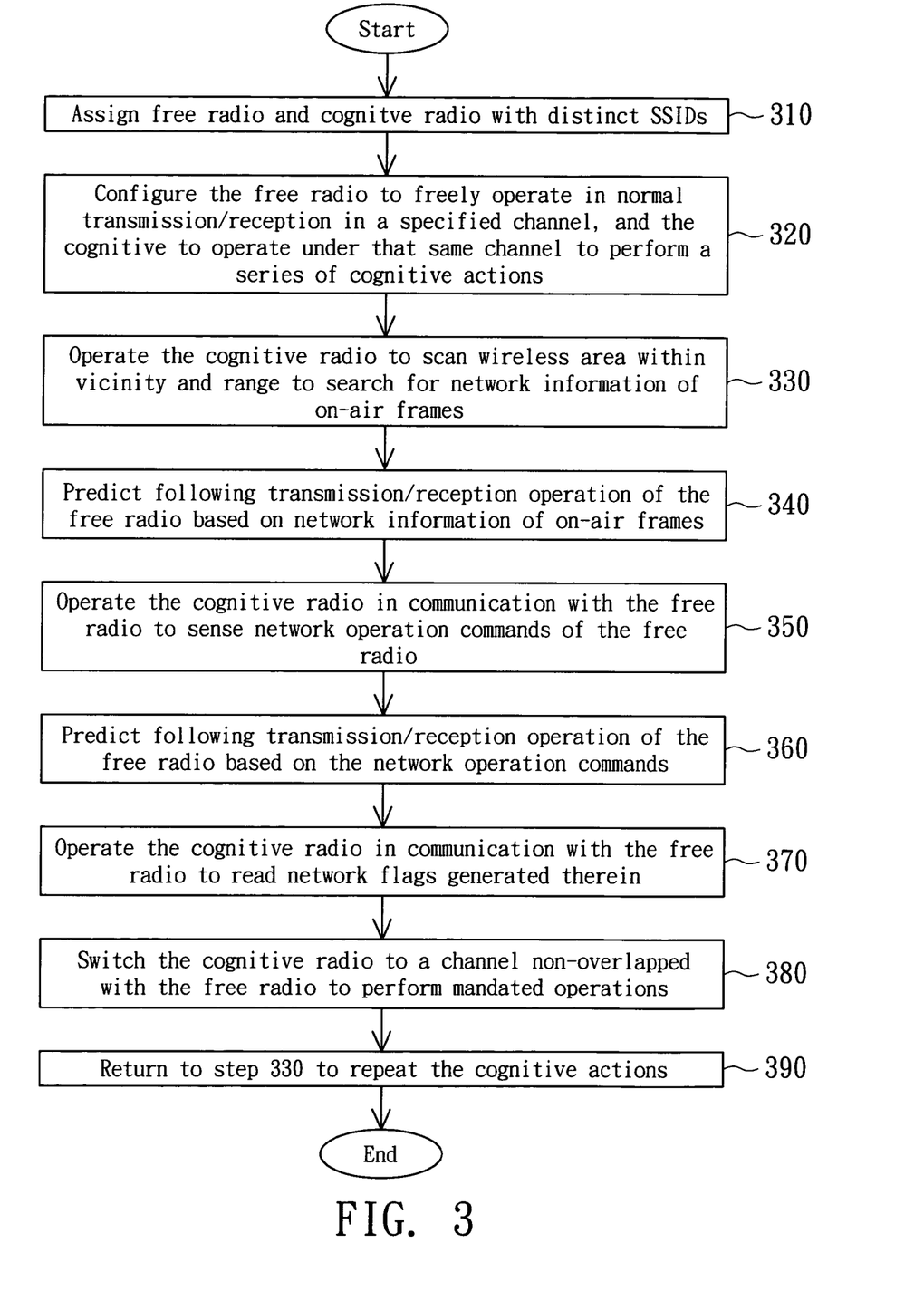
FIG. 3 shows a method of radio control according to a preferred embodiment of the invention.

FIG. 3 shows a method of radio control according to a preferred embodiment of the invention. The method is adapted in the wireless device 100. The method begins with preliminary actions in which the cognitive radio and the free radio are each assigned with a unique service set identifier (SSID), as shown in step 310. Then, in the following step 320, the free radio is configured to freely operate in normal transmission or reception in a specified channel, while the cognitive radio is configured to operate under that same channel to perform a series of cognitive actions. Next, step 330 performs a first cognitive action to operate the cognitive radio to scan wireless area within geographical vicinity, or range, and search therein for network information of on-air frames sent from or to the free radio. The network information of on-air frames is indicative of past operational status of the free radio. Next, step 340 is performed to predict the following transmission/reception status of the free radio. If the SSID, format and type of the frames indicates that the past operational status of the free radio is to transmit, then it is predicted that the present (or future in the past) operational status of the free radio is to receive. Thus, the present (or future in the past) operations of the cognitive radio is configured to either standby or receive. If the SSID, format and type of the frames indicates that the past operational status of the free radio is to receive, then it is predicted that the following action, being the present (or future in the past) operational status of the free radio, is to transmit. Thus, the following operations of the present (or future in the past) of the cognitive radio is configured to standby or transmit.

Next, step 350 is performed a second cognitive action to operate the cognitive radio in communication with the free radio to sense network operation commands of the free radio. The network operation commands are indicative of present operational status of the free radio. Then, following identification of the present operations status, step 360 is performed to predict the following transmission/reception operation of the free radio. If the network operation command, indicative of the following action of the free radio, is the transmit command, giving clue to that the following operation of present of the free radio is to transmit. Thus, the cognitive radio is configured to either standby or transmit in following operation. Conversely, if the network operation command is the receive command, then for the same logical reasoning as above, the following operation of present of the cognitive radio is configured to receive or standby. Next, step 370 is performed a third cognitive action for operating the cognitive radio in communication with the free radio to read network flags generated therein. The network flags is indicative of future operational status of the free radio. Thus, based on the identification of the network flags, the future operations status of the cognitive radio can be configured.

Thus, as shown, the cognitive radio is appropriately configured based on the operational status of the free radio. More specifically, the future operations of the cognitive radio can be configured based on at least one of the past operations status, the present operational status, and the future operational status of the free radio so as to reduce channel interferences with the free radio. Following the completion of the cognitive actions, in step 380, the cognitive radio is configured under the suggestion to complete mandated operations such as to operate as an AP, after being switched to a non-overlapped channel of the free radio to get less risk to collide with the co-channel interferences. Once the cognitive radio has completed its mandated operations, the cognitive radio is switched back to Ch. 1 and step 330 is returned to repeat the cognitive actions, as indicated by step 390.

Thus, as shown, by applying the method of radio control and the wireless device according to the embodiments of the invention, the problem of channel interferences is greatly minimized. The cognitive radio is able to sense network conditions, being the operational status of the free radio, and adapt to the network conditions by changing its operation, thereby reducing channel interferences.

Although the antenna assembly in FIG. 1 is shown having orthogonally polarized antenna elements by using crossed dipoles for example, the antenna assembly can alternatively or additionally include antenna elements by using in-line dipoles for example, with radiation patterns having opposite nulls, and can be easily implemented by a person skilled in the art.

The wireless device according to the embodiments of the invention has been described in configuration of dual channels in a same wireless LAN operating band (both operate under IEEE 802.11g); however, the wireless device in the embodiments can also be configured to operate in dual channels in two different wireless LAN operating bands, such as one in 802.11g channel, and one in 802.11a channel, or even operating in more than two channels, which can be easily implemented by a person having ordinary skills in the art.

In the embodiments, the cognitive radio and the free radio are shown operating under different channels as an additional effort to provide common guard. However, in the embodiments, a channel can also be effectively reused by two the radios if provided with proper and adaptive time multiplexing.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of radio control, adapted in a wireless device comprising a cognitive radio and a free radio, the method comprising:
   a). scanning by the cognitive radio to receive frames sent from or to the free radio, for retrieving network information of on-air frames indicative of past operational status of the free radio;
   b). sensing by the cognitive radio network operation commands of the free radio, the network operations commands being indicative of present operational status of the free radio;
   c). reading by the cognitive radio network flags generated in the free radio indicative of future operational status of the free radio; and
   d). configuring future operation of the cognitive radio based on at least one of the past operational status, the present operational status, and the future operational status of the free radio so as to reduce channel interferences with the free radio.

2. The method according to claim 1, wherein step a) comprises:
   finding frames sent from or to the free radio based on relevant BSSID or MACID; and
   identifying the past operational status of the free radio based on the SSID, format and type of the frames sent from or to the free radio.

3. The method according to claim 2 comprising:
   if the format of the frames indicates that the past operational status of the free radio is to transmit, then configuring the following future-in-the-past operations of the cognitive radio to either standby or transmit;
   if the format of the frames indicates that the past operational status of the free radio is to receive, then configuring the following future-in-the-past operations of the cognitive radio to standby or receive.

4. The method according to claim 1, wherein the network operation command comprises a transmit command and a receive command, step d) comprising:
   if the present network operation command is the transmit command, configuring the following operations of present of the cognitive radio to either standby or transmit; and
   if the present network operation command is the receive command, configuring the following operations of present of the cognitive radio to either standby or receive.

5. The method according to claim 1, wherein the network flags are generated in media access control (MAC) layer of the free radio.

6. The method according to claim 1, further comprising:
   assigning the free radio and the cognitive with different BSSIDs.

7. The method according to claim 1, wherein step d) comprises:
   configuring the cognitive radio to operate in a channel non-overlapped by that of the free radio.

8. The method according to claim 1, wherein step c) comprises:
   if the network flags indicates that the future operational status of the free radio is to transmit, then configuring the following future operations of the cognitive radio to either standby or transmit;
   if the network flags indicates that the future operational status of the free radio is to receive, then configuring the following future operations of the cognitive radio to either standby or receive.

9. A wireless device connecting to a network, comprising:
   a cognitive radio and a free radio, each comprising:
      a controller for processing data to/from the network;
      a radio circuit, in electrical communication with the controller to modulate data from the controller and to demodulate data to the controller; and
      an antenna assembly, in electrical communication with the radio circuit to transmit signals received from the radio circuit, and to receive signals which are sent to the radio circuit;
   wherein the cognitive radio scans wireless area and searches therein for network information of on-air frames sent from or to the free radio;
   wherein the free radio is in communication with the cognitive radio, the cognitive radio senses network operation commands of the free radio and reads network flags generated in the free radio;
   wherein future operation of the cognitive radio is configured based on at least one of the network information of on-air frames, the network operation commands, and the network flags of the free radio.

10. The device according to claim 9, wherein the free radio further comprises:
    a first switch network, providing electrical communication between the free radio and the cognitive radio in transferring signals therebetween, and providing electrical communication between the antenna assembly and the radio circuit;
    a filter element, coupled to the antenna assembly via the first switch network, for blocking or attenuating noises associated with either the signals received from the antenna assembly which are sent to the radio circuit, or the signals received from the radio circuit which are sent to the antenna assembly; and a second switch network, for switching operation of the radio circuit between modulation and demodulation.

11. The device according to claim 10, wherein the first switch network comprises double-pole-double-throw switches.

12. The device according to claim 10, wherein the second switch network comprises double-pole-double-throw switches.

13. The device according to claim 10, wherein the filter element comprises serial banks of tuned filters and notched filters.

14. The device according to claim 9, wherein the antenna assembly comprises antenna elements forming radiation patterns with opposite nulls.

15. The device according to claim 9, wherein the antenna assembly comprises orthogonally-polarized antenna elements.

16. The device according to claim 9 operating under time division multiplexing.

17. The device according to claim 9, wherein the controller comprises a media access control layer and a base band processor of physical layer.

18. The device according to claim 9, wherein the cognitive radio and the free radio communicate with each other via software transfer.

19. The device according to claim 9, wherein the cognitive radio and the free radio communicate with each other via hardware wiring.

* * * * *